United States Patent
Maher et al.

(10) Patent No.: US 9,751,099 B2
(45) Date of Patent: Sep. 5, 2017

(54) WURSTER ACCELERATOR WITH POWDER APPLICATOR

(71) Applicant: FREUND-VECTOR CORPORATION, Marion, IA (US)

(72) Inventors: Larry A. Maher, West Branch, IA (US); Brian K. Jensen, Cedar Rapids, IA (US); Shawn M. Engels, Tipton, IA (US)

(73) Assignee: Freund-Victor Corporation, Marion, IA (US)

( * ) Notice: Subject to any disclaimer, the term of this patent is extended or adjusted under 35 U.S.C. 154(b) by 316 days.

(21) Appl. No.: 14/620,578

(22) Filed: Feb. 12, 2015

(65) Prior Publication Data

US 2015/0352568 A1    Dec. 10, 2015

Related U.S. Application Data

(60) Provisional application No. 62/010,243, filed on Jun. 10, 2014.

(51) Int. Cl.
| | |
|---|---|
| *B01J 2/16* | (2006.01) |
| *B05B 7/00* | (2006.01) |
| *B05B 7/02* | (2006.01) |
| *B05D 1/12* | (2006.01) |
| *B01J 2/00* | (2006.01) |
| *B05B 7/14* | (2006.01) |

(52) U.S. Cl.
CPC ............. *B05B 7/02* (2013.01); *B01J 2/006* (2013.01); *B01J 2/16* (2013.01); *B05B 7/1495* (2013.01); *B05D 1/12* (2013.01)

(58) Field of Classification Search
CPC ............ B01J 2/16; B05B 7/00; B05B 7/1495

USPC .................... 427/212; 118/309, 310
See application file for complete search history.

(56) References Cited

U.S. PATENT DOCUMENTS

| | | | | |
|---|---|---|---|---|
| 3,196,827 A | * | 7/1965 | Wurster | A61J 3/005 118/24 |
| 5,437,889 A | * | 8/1995 | Jones | A61J 3/005 427/185 |
| 6,322,000 B1 | * | 11/2001 | Scarpa | B05B 7/066 239/112 |
| 6,685,775 B1 | | 2/2004 | Jensen | |
| 6,736,897 B2 | | 5/2004 | Jensen | |
| 6,773,747 B2 | | 8/2004 | Jensen | |
| 7,147,717 B2 | * | 12/2006 | Bender | B01J 2/16 118/303 |
| 7,297,314 B2 | * | 11/2007 | Natsuyama | B01J 2/006 118/309 |

(Continued)

FOREIGN PATENT DOCUMENTS

JP            4145937            5/1992

OTHER PUBLICATIONS

JP4-145937—POWREX KK—English Abstract.

*Primary Examiner* — Cachet Sellman
(74) *Attorney, Agent, or Firm* — McKee, Voorhees & Sease, PLC

(57) ABSTRACT

A Wurster processor and a powder feed system are coupled via an eductor so as to supply dry powder through the air diverter sleeve of the Wurster for discharging onto the circulating particles during operation of the Wurster. Agglomeration and aggregation of the particles is eliminated or minimized by isolating or separating the liquid spray by the spray gun from the dry powder.

15 Claims, 6 Drawing Sheets

(56) References Cited

U.S. PATENT DOCUMENTS

| | | | |
|---|---|---|---|
| 2001/0055648 A1* | 12/2001 | Lee | B01J 2/006 427/213 |
| 2003/0157246 A1* | 8/2003 | Jensen | B01F 13/0261 427/212 |
| 2010/0031881 A1 | 2/2010 | Jensen | |
| 2010/0034967 A1* | 2/2010 | Engels | B01J 2/006 427/180 |

* cited by examiner

WURSTER ACCELERATOR WITH POWDER APPLICATOR

CROSS REFERENCE TO RELATED APPLICATIONS

This application claims priority under 35 U.S.C. §119 to provisional applications U.S. Ser. No. 62/010,243 filed Jun. 10, 2014, herein incorporated by reference in its entirety.

BACKGROUND OF THE INVENTION

Wurster coating of multi-particulates with polymer suspensions and solutions is widespread in the pharmaceutical industry. Several formulations for polymer coatings of aqueous dispersions and organic solvent based polymer systems require glidants such as talc, stearates, silica compounds, calcium compounds, and many other materials to be suspended into the polymer solutions to cut down on polymer tackiness and reduce agglomeration. These glidants can aggregate or may not be available as a fine enough particle to suspend indefinitely and so can fall out of solution during the process, causing spray gun plugging and line plugging. Plugging of the spray gun and lines normally requires shutdown of the machine for cleaning, which delays the coating process and increases the production costs. Adding glidant to a suspension or solution reduces the rate of polymer application by the very nature of the formulation, which typically requires the same amount of glidant to be in suspension as polymer. For a given application rate only half is polymer, leading to extended processing times and inefficient coating processes.

In the typical spray application where glidant is included in the suspension or solution, the glidant is necessarily coated with polymer as it is sprayed on to the substrate particle, reducing its ability to spread on to the substrate and is less effective in reducing aggregation.

Therefore, there is a need for an improved Wurster coating machine and process, which eliminates the problems in the prior art.

Accordingly, a primary objective of the present invention is the provision of a Wurster accelerator having a powder applicator with improved performance.

Another objective of the present invention is the provision of a Wurster accelerator which applies dry powder without plugging a spray gun or associated lines.

A further objective of the present invention is the provision of a Wurster coating machine which applies dry powder to the particles in the fluid bed without agglomeration or aggregation.

Still another objective of the present invention is the provision of a Wurster accelerator with a dry powder line connected to the accelerator sleeve to deliver dry powder to the particles in the fluid bed.

Yet another objective of the present invention is the provision of a process for coating particulate material with dry powder using a Wurster accelerator.

A further objective of the invention is to reduce suspension or solution preparation time and complexity in a Wurster coating processor.

A further objective is the provision of a Wurster dry powder coating process wherein the glidant it removed from the suspension or solution and applied as a dry substance, thereby increasing its efficient use and efficacy in reducing aggregation, compared to glidant that is in suspension and therefore coated with polymer as it is applied in the spray.

A further objective is the provision of a Wurster dry powder coating process which allows higher amounts of polymer in suspension or solution by eliminating the glidants in the suspensions or solutions.

A further objective is the provision of a Wurster dry powder coating process which applies polymer at a faster rate to the substrate due to the higher amount of polymer in the suspension or solution.

A further objective is the provision of a Wurster dry powder coating process which applies polymer at a faster rate due to the greater efficiency and efficacy of applying the glidant as a dry powder to reduce aggregation.

Another objective of the invention is to remove the suspended solids (inactive excipients such as talc, disintegrant such as crospovidone, nutritional additives such as probiotics, API's such as Fexofenidine and any material) from the suspension or solution, thereby removing sedimentation and clogging in the lines and spray gun of a Wurster coater.

Another objective of the present invention is the provision of a Wurster dry powder coating process which applies disintegrants as a dry powder directly to the substrate without the disintegrant being hydrated.

Another objective of the present invention is the provision of a Wurster processor with improved sprayability, reduced process time, and reduced solution instability of certain pharmaceutical and other polymers containing insoluble solids and or soluble solids.

Still another objective of the present invention is the provision of a Wurster coating apparatus which applies solids without needing to suspend or solubilize the solids so as to improve the process, reduce time and avoid instability of the solids with water or other solvents.

These and other objectives will become apparent from the following description of the invention.

SUMMARY OF THE INVENTION

The invention utilizes the Wurster accelerator spray gun system to apply dry, finely divided solid substances during a Wurster process by replacing the original accelerator diverter sleeve compressed air supply with a vacuum generating eductor thereby causing powder to be entrained into the diverter air flow and distributed via the plurality of (radial) holes of the diverter sleeve. By applying the powder in a dry form to the particles circulating in the fluid bed of the processor, agglomeration and/or aggregation is eliminated or minimized.

This modified Wurster invention can apply any finely divided, dry solid substance including but not limited to chemicals and polymers and active pharmaceutical ingredients (API's) and inactive substances often known as excipients, and/or any combination of these.

The invention uniformly distributes the finely divided powder due to accelerator design, including an air diverter sleeve, as described in Applicant's U.S. Pat. Nos. 6,685,775, 6,736,897 and 6,773,747, each and all incorporated herein by reference.

The invention also precisely controls powder feed rate due to the eductor/feeder arrangement, described in Applicant's published U.S. Patent Application No. 2010/0031881, incorporated herein by reference.

The invention applies finely divided powders without interfering with spray pattern or droplet distribution in any way, and without interfering with the normal product movement within the Wurster apparatus in any way.

The invention can be used with organic solvent systems, inorganic solvent systems and aqueous solvent systems and any combination thereof, such as hydro-alcoholic or hydro-acetonic systems.

The modified Wurster invention prevents agglomeration or aggregation of a substrate due to the characteristics of the spray liquid by applying a dry glidant.

The invention also prevents agglomeration or aggregation due to the use of high spray rates by applying a glidant in a dry form.

The invention also prevents agglomeration or aggregation due to the use of high polymer content in the sprayed liquid by applying a glidant in a dry form.

The invention allows the use of high polymer content in the sprayed liquid by applying a glidant in a dry form.

The invention allows the use of high spray rates by applying glidant in a dry form.

The invention allows the use of undiluted polymer suspensions and reduces the complexity of suspension or solution preparation.

The Wurster modification of the present invention can be used to apply API's (such as but not limited to: analgesics, antibiotics, antivirals, cardiac drugs, etc.) to produce a chemical, food, pharmaceutical or other product while spraying a solvent and or a binder, and/or while spraying a modified release polymer.

DETAILED DESCRIPTION OF THE PREFERRED EMBODIMENTS

Figure 1:
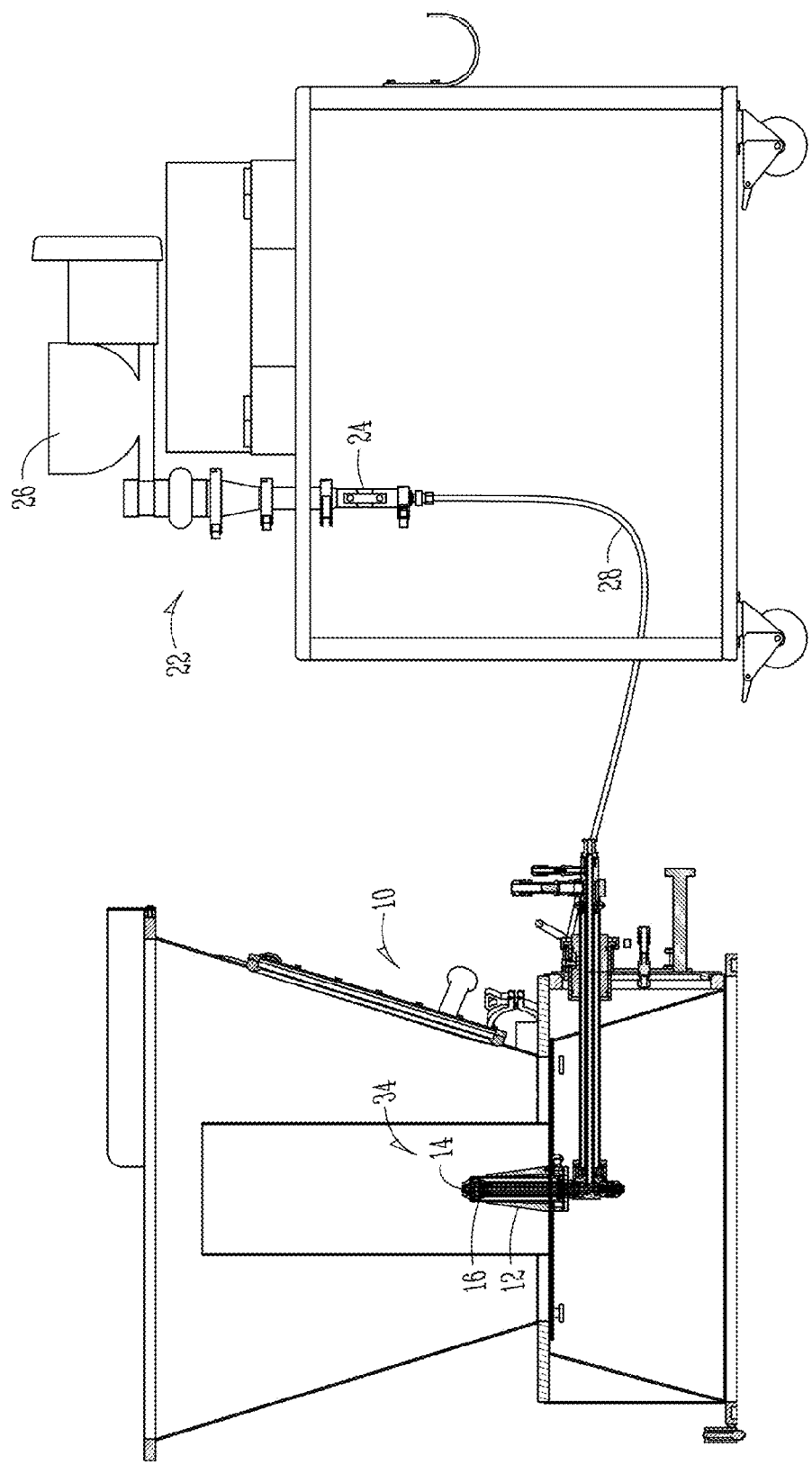
FIG. 1 is a schematic view showing a powder coating system with a Wurster accelerator having the powder applicator according to the present invention.

A Wurster accelerator for coating particles is generally designated in the drawings by the reference numeral 10. The Wurster 10 includes a spray gun 12, with a nozzle tip 14.

A cylindrical sleeve or air diverter 16 extends around the spray gun 12 and defines an annular space 18 between the diverter 16 and the gun 12. The diverter 16 includes a plurality of discharge ports 20 at the upper end of the diverter 16. In a preferred embodiment, the ports 20 are angled at approximately 45° relative to the longitudinal axis of the spray gun 12, less preferably at 50°, and much less preferably at 37° and 30°.

A powder feed system is generally designated by the reference numeral 22 in the drawings. The feed system 22 includes a precision load cell metering device with an eductor 24 extending between the device or powder source 26 and the Wurster Accelerator System 10. A powder line 28 connects the eductor 24 to the Wurster Accelerator System 10 so the powder can flow from the powder source 26 to the air diverter 16. A coupler 30 connects the powder line to the Wurster Accelerator System 10 and to the air diverter and thereby creates a path for the powder to enter through a plurality of inlet ports 32 in the base of the air diverter 16. During operation of the Wurster accelerator 10, the powder flows upwardly through the annular space 18 and is discharged through the outlet ports 20 in a direction away from the liquid sprayed by the nozzle tip 14 and onto the particles circulating in the up bed 34 of the Wurster Accelerator System 10.

Figure 7:
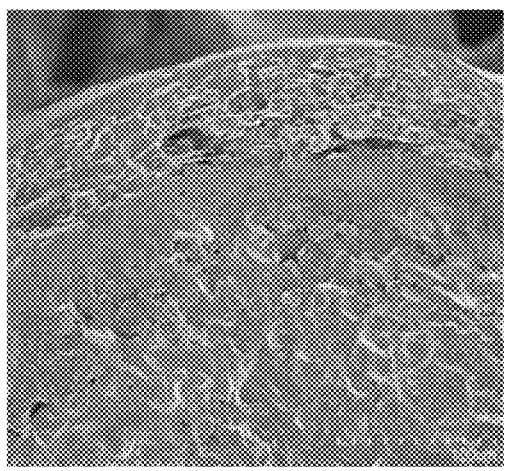
FIG. 7 is a SEM image of a coated bead utilizing the Wurster accelerator system with the dry powder applicator according to the present invention.

In a preferred embodiment, the air diverter 16 has between 15 and 55 equally spaced outlet ports 20, most preferably 36 equally spaced outlet ports 20, which can range in diameter from 0.75 mm to 5.00 mm, more preferably 1.00 mm to 3.00 mm, and most preferably 1.2 mm to 2.4 mm, and six equally spaced inlet ports 32 having a diameter of approximately one quarter inch and angled at approximately 35°, as seen in FIG. 7. It is understood that the number, size and angle of the inlet and outlet ports may be modified without departing from the scope of the present invention.

In operation, the dry powder is applied through the diverter sleeve 16 to the fluidized particles or substrates without agglomeration or aggregation, since the powder is not suspended or dispersed in the liquid spray from the nozzle tip 14.

Figure 2:
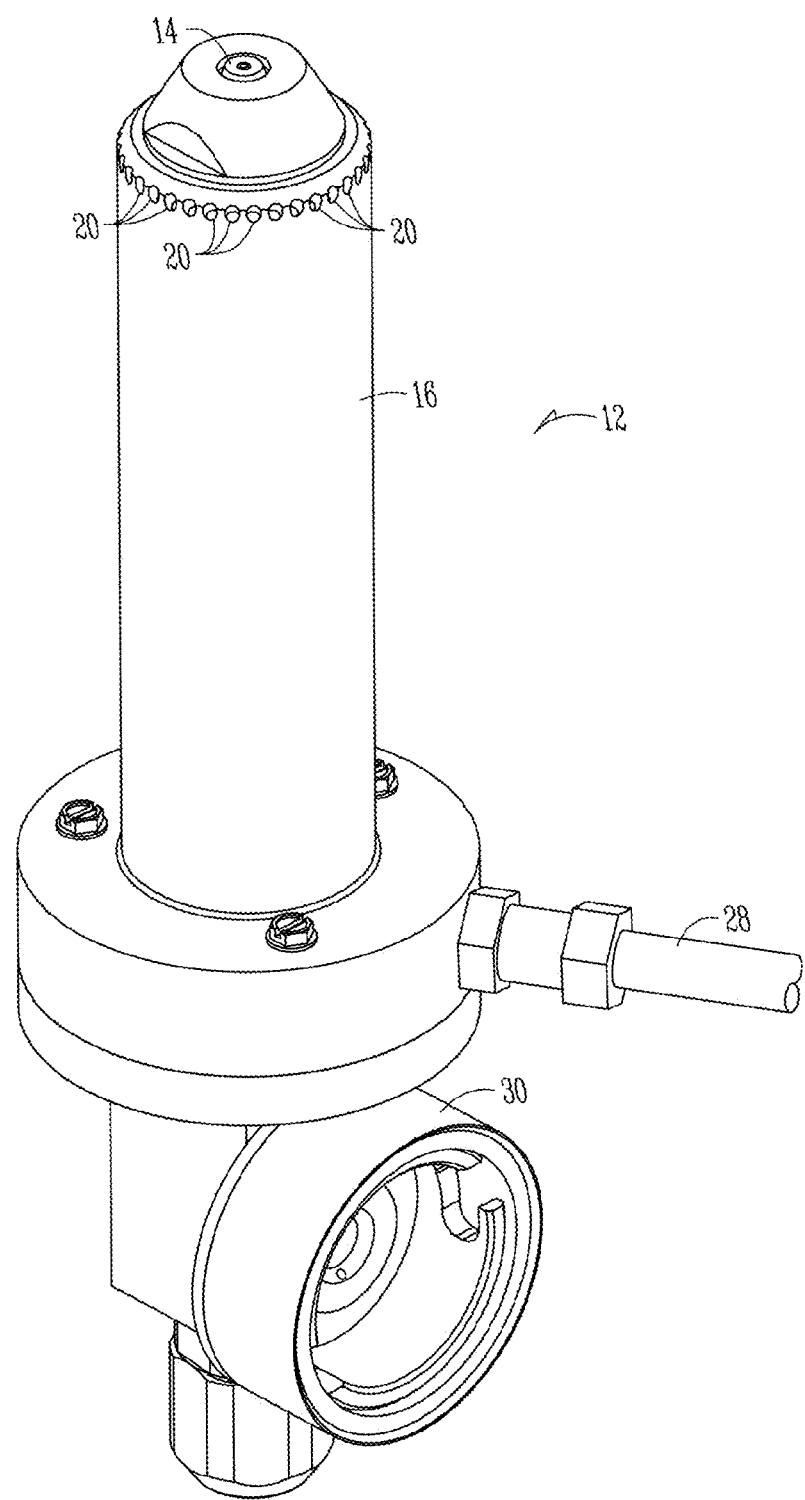
FIG. 2 is a perspective view of the spray gun and diverter sleeve, with the powder applicator adapter.
Figure 3:
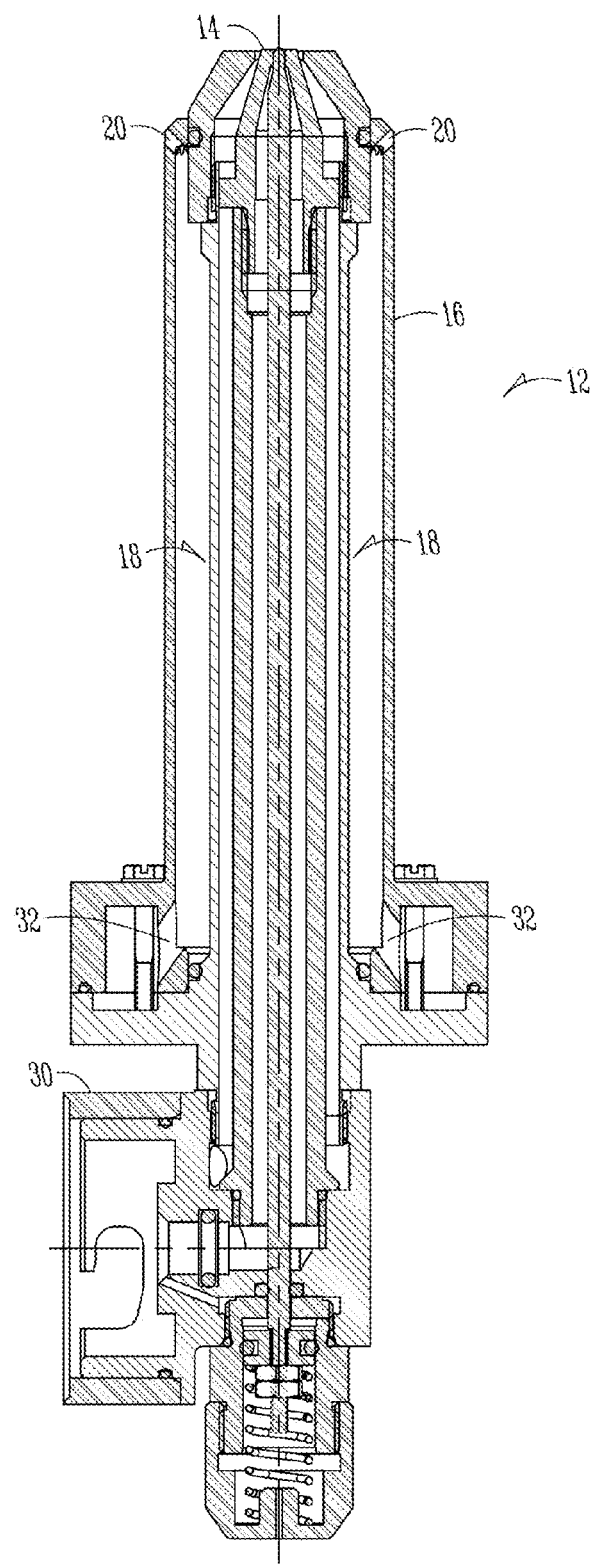
FIG. 3 is a sectional view taken along lines 3-3 of FIG. 2.
Figure 4:
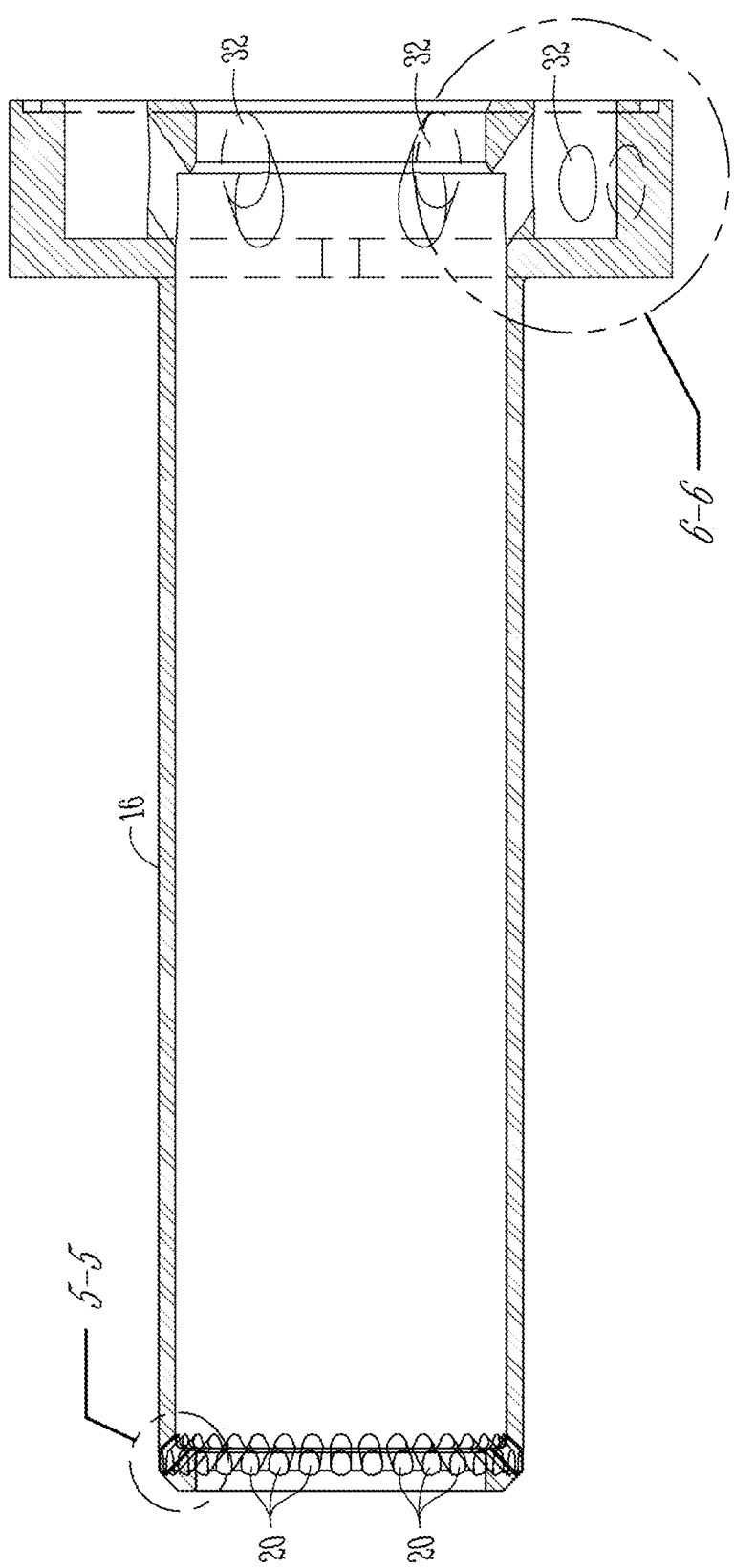
FIG. 4 is a sectional view of the diverter sleeve.
Figure 5:
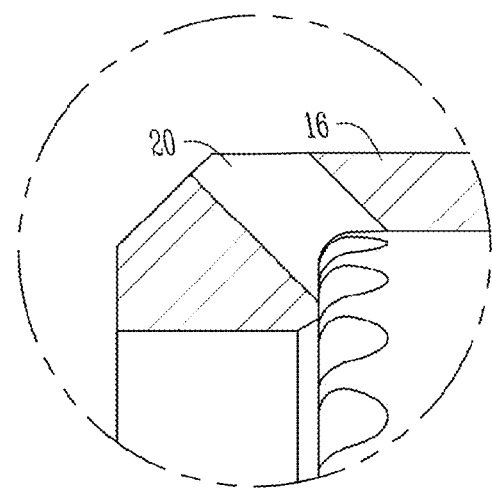
FIG. 5 is an enlarged sectional view of a powder outlet port in the sleeve, according to the present invention.
Figure 6:
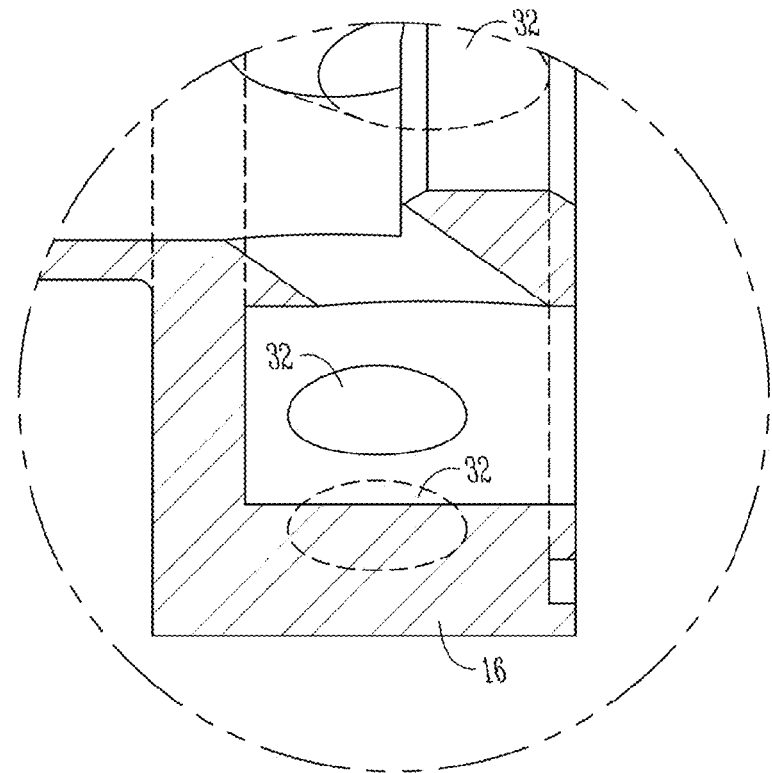
FIG. 6 is a sectional view of a powder inlet port in the sleeve, according to the present invention.

FIGS. 1 and 2 show a first embodiment of a modified spray gun assembly for a Wurster accelerator, according to the present invention. FIGS. 3 and 4 show a second embodiment of the modified gun assembly for a Wurster spray accelerator, in accordance with the present invention. In both embodiments, the conventional Wurster gun assembly is modified by adding the adapter 28, which is connected to the eductor 24 of a powder feeder system, shown in FIGS. 5 and 6. With the powder feed system connected to the gun assembly via the eductor 24 and adapter 23, dry powder is supplied to the Wurster sleeve 16 via the inlet ports 32 in the base of the sleeve 16. The dry powder is expelled or discharged through the plurality of outlet ports 20 at the upper end of the sleeve 16 adjacent the tip of the spray nozzle. The difference between the first and second embodiments is the size of the discharge ports. The sleeve is also connected to a pressurized air source, which provides air into the space between the sleeve 16 and the gun assembly 12, as described in the patents cited above. The pressurized air carries the powder through the space from the inlet ports 32 to the outlet ports 20.

Process Description

In a bottom spray Wurster application any solids, normally suspended into a liquid and sprayed via the solution spray gun onto a substrate, are instead applied via the 45 degree Wurster accelerator sleeve 16 in dry form with a powder feeder. The accelerator sleeve 16 disperses the solids directly into the spray zone of the standard Wurster spray gun 12, where the powder contacts and sticks to the substrate particulate material.

Substrate materials benefiting from this invention include:

- Sugar spheres sized from 5-10000 microns, which can contain monosaccharides, e.g. glucose, fructose, ribose; disaccharides e.g. sucrose, lactose, maltose; polysaccharides such as starch, maltodextrin, cellulose; sugar alcohols e.g. mannitol, sorbitol, xylitol; or combinations of any of the above.
- Microcrystalline cellulose spheres sized from 5-10000 microns
- Active Pharmaceutical Ingredient (API) pellets, cores or powders sized from 5-10000 microns
  - API can consist of Omeprazole, Lansoprazole, Acetaminophen, Mesalamine, Aspirin, Potassium Chloride, Dexlansoprazole, Diltiazem, Guifenesin, Dextromethorphan, Chlorophenaramine, Atorvastatin Calcium, Simvastatin, Ciprofloxacin, Metformin, Ambraxol HCL, Caffeine, Calcium Chloride, Calcium Sulfate, Cephalosporin, Clarithromycin, Ibuprofen, Flurbiprofen, Dypiridimole, Erythromycin, Esopiclone, naproxen, Fexofenadine, Fish Oil, Gabapentin, Glucosamine and/or any other known active pharmaceutical ingredient or a combination of two or more of the same.

Excipient Pellets or Powders sized from 5-10000 microns

Excipients can consist of Lactose, Starch—all variations (Pre-gelatinized and non Pre-gelatinized), microcrystalline cellulose, glass, silica, resin, tartaric acid, fumaric acid, talc, Magnesium Stearate, Sucrose, Crosscarmellose sodium, Stearic Acid, cross povidone, Maltodextrin, Mannitol, sorbitol, sucralose, Titanium dioxide and/or any other pharmaceutical or food excipient, or a combination of two or more of the same.

Food Pellets or Powders sized from 5-10000 microns

Foods can consist of tobacco, cocoa, flour—all types, herbs—all types, powdered milk, powdered cheese, gum—all types, oats—all types, seeds—all types, vegetable powders—all types, sodium chloride, Soy, proteins—all types, enzymes—all types, coffee, animal byproducts—all types, popcorn, Powdered flavors—all types, rice, powdered drink mixes—all types, and/or any other food related powder or pellet, or a combination of two or more of the same.

Coating materials that benefit from this invention include:

Water Soluble Pharmaceutical Polymers from concentrations of 0.1-70%

Water Soluble Pharmaceutical polymers can include Hydroxypropyl Methylcellulose (HPMC)—All grades, Hydroxypropyl Cellulose (HPC) all grades, Polyvinyl Acetate, Polyvinyl Alcohol (PVA), Povidone (PVP) all grades, Pre-gelatinized starch—all grades, Maltodextrin—All grades, Natural Sugars—All types, Gums—all Types, Alginates—All types and any other water soluble polymers, or a combination of two or more of the same.

Organic Spirit Soluble Polymers concentrations of 0.1-70%

Organic Spirit Soluble Polymers can include Ethylcellulose—All grades, Methyl Methacrylates—All grades, All types, Hydroxy Propyl Cellulose (HPC) All Grades, Polyethylene Glycol (PEG) Sodium Glycol, Polyvinyl Acetate (PVAC) all grades, polyvinylidene chloride (PVDC), Acrylic Polymers all types, all grades and any other organic spirit soluble polymers, or a combination of two or more of the same.

Aqueous Dispersions concentrations of 0.1-70%

Aqueous dispersions can include Acrylic polymers—All types, all grades; Ethylcellulose—All types, all grades; Methyl Methacrylates; polyvinylidene chloride (PVDC), and any other Aqueous dispersion of a polymer, or a combination of two or more of the same.

API loaded suspensions or solutions concentrations of 0.1-70%

API loaded suspension or solutions can include Omeprazole, Lansoprazole, Acetaminophen, Mesalamine, Aspirin, Potassium Chloride, Dexlansoprazole, Diltiazem, Guifenesin, Dextromethorphan, Chlorophenaramine, Atorvastatin Calcium, Simvastatin, Ciprofloxacin, Metformin, Ambraxol HCL, Caffeine, Calcium Chloride, Calcium Sulfate, Cephalosporin, Clarithromycin, Ibuprofen, Flurbiprofen, Dypiridimole, 5 Erythromycin, Esopiclone, naproxen, Fexofenadine, Fish Oil, Gabapentin, Glucosamine and/or any other known active pharmaceutical ingredient, or a combination of two or more of the same.

Potential powdered solids that can benefit from this invention include:

Powdered Excipients sized from 0.1-100 microns

Powdered excipients can include of Lactose, Starch—all variations (Pre-gelatinized and non Pre-gelatinized), microcrystalline cellulose, glass, silica, resin, tartaric acid, talc, Magnesium Stearate, Sucrose, Crosscarmellose sodium, Stearic Acid, cross povidone, Maltodextrin, Mannitol, sorbitol, sucralose, Titanium dioxide and/or any other pharmaceutical or food excipient, or a combination of two or more of the same.

API powders sized from 0.1-100 microns

API powders can include Omeprazole, Lansoprazole, Acetaminophen, Mesalamine, Aspirin, Potassium Chloride, Dexlansoprazole, Diltiazem, Guifenesin, Dextromethorphan, Chlorophenaramine, Atorvastatin Calcium, Simvastatin, Ciprofloxacin, Metformin, Ambraxol HCL, Caffeine, Calcium Chloride, Calcium Sulfate, Cephalosporin, Clarithromycin, Ibuprofen, Flurbiprofen, Dypiridimole, Erythromycin, Esopiclone, naproxen, Fexofenadine, Fish Oil, Gabapentin, Glucosamine and/or any other known active pharmaceutical ingredient, or a combination of two or more of the same.

Polymer powders sized from 0.1-100 microns

Polymer powders can include Hydroxypropyl Methylcellulose (HPMC)—All grades, Hydroxypropyl Cellulose (HPC) all grades, Polyvinyl Acetate, Polyvinyl Alcohol (PVA), Povidone (PVP) all grades, Pre-gelatinized starch—all grades, Maltodextrin—All grades, Natural Sugars—All types, Gums—all Types, Alginates—All types and any other water soluble polymers. Ethylcellulose—All grades, Methyl Methacrylates—All grades, All types, Hydroxy Propyl Cellulose (HPC) All Grades, Polyethylene Glycol (PEG) Sodium Glycol, Polyvinyl Acetate (PVAC) all grades, polyvinylidene chloride (PVDC), Acrylic Polymers all types, all grades and any other organic spirit soluble polymers, or a combination of two or more of the same.

Ratio of powder to solution applied to substrate can range from 1:1000 to 1000:1

Air Pressure used to disperse the powder through the Wurster Accelerator can range from 0.1 psi to 1000 psi.

Air Pressure used to Atomize the solution spray can range from 0.1 psi to 1000 psi Inlet air temperature to the fluid bed can range from −30 C to 150 C Exhaust air temperature can range from −30 C to 150 C Solution spray rate can range from 0.1 g/min to 100,000 g/min Powder addition rate can range from 0.1 g/min to 100,000 g/min

Inlet Fluidizing Air Flow can range from 0.1 CFM to 100,000 CFM

Example 1

Utilizing an 18" straight sided Wurster column, (Wurster Accelerator System, Freund-Vector Corporation) 50 KG of granular potassium chloride was coated with an 18% solids suspension of Eudragit L30 D 55 (Evonik/Degussa).

with 0.71% agglomeration during the coating trial. A 10% coating level was achieved in only 73 minutes of spray time at an efficiency of 96.0%.

The talc amount applied was held at a constant 50% to the polymer solids throughout the coating run. No gun or solution line plugging occurred and no solution mixing was required during the trial.

In Example 2 spray rates of 450 g/min or less led to over four times more aggregation, 2.92%, and slightly lower efficiency at 95.1% and ~33% more time to coat.

Example Results

| Process | Process Time | Agglomeration % | Final Particle size | Batch Size (kg) | Yield (%) | Spray Rate (g/min) | Polymer application rate (g/min) |
|---|---|---|---|---|---|---|---|
| Wurster Accelerator Standard Spray Coating | 110 mins | 2.92% | 460 microns | 50 | 95.1 | Avg. of 350, max 450 | 35-45 |
| Wurster Accelerator with dry powder applicator | 73 mins | 0.71% | 460 microns | 50 | 96.0 | Avg. of 500, max of 650 | 95-117 |

Eudragit L30 D 55 is supplied as a 30% solids suspension and typically diluted to around 15% for use. Dilutions of 15% and 18% were evaluated. The invention allows higher solids content to be used and an 18% dilution was used in Example 1.

During the spray process, using a K Tron KT20 loss in weight powder feeder, talc was injected directly into the spray zone through the 45 degree Wurster Accelerator sleeve on the spray gun. Talc was applied at a rate equivalent to 50% based on the polymer solids being applied, as instructed by the polymer manufacturer's recommendations.

Example 2

Utilizing an 18" straight sided Wurster column, (Wurster Accelerator System, Freund-Vector Corporation) 50 KG of granular potassium chloride was coated with a 15% solids suspension of Eudragit L30 D 55 (Evonik/Degussa). For conventional spray coating the manufacturer recommended polymer solids is typically 15%.

In this standard spray approach the glidant (talc) was incorporated (mixed) in the polymer suspension at the same 50% based upon polymer solids rate and sprayed as an admixture with the polymer solids. Coating conditions were held constant as in Example 1.

Results from Example 1 and Example 2

Maximum spray rate with less than 1% aggregation (agglomeration) of the potassium chloride cores and efficiency of transfer was used as a measure of the difference between the Standard spray process and that of the invention.

In Example 1, spray rates of up to 650 g/min, equivalent to 117 grams of polymer per minute, were accomplished Applying talc through the Wurster Accelerator sleeve directly into the spray zone allowed for increased spray rates with reduced agglomeration during the coating process. By removing the solid glidant material out of the spray solution, the need to constantly stir the solution and the potential for line plugging or gun failure during the process was eliminated.

Thus, the invention modifies to an existing Wurster spray system to add solid glidants via a powder feeder in dry form during the Wurster coating process.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An method of coating particulate material using a Wurster apparatus having a gun assembly with a spray nozzle for spraying liquid onto the particulate material, and a sleeve surrounding the gun assembly, the method comprising:
   supplying dry powder into the sleeve, and
   discharging the dry powder from the sleeve in a radially outward direction adjacent the spray nozzle to coat the particulate material.

2. The method of claim 1, wherein the dry powder passes through an annular space between the sleeve and the spray nozzle.

3. The method of claim 1, wherein the dry powder is an excipient.

4. The method of claim 1, wherein the dry powder is an active pharmaceutical ingredient.

5. The method of claim 1, wherein the dry powder is a polymer.

6. The method of claim 1, wherein the dry powder is supplied to the sleeve by pressurized air.

7. The method of claim 1, wherein the dry powder is supplied to the sleeve by an eductor.

8. The method of claim 1, wherein the dry powder is discharged from a plurality of ports in the sleeve adjacent a tip of the spray nozzle.

9. The method of claim 1, wherein the dry powder is applied to the particulate material without being suspended or solubilized in a liquid.

10. The method of claim 1, wherein the dry powder is applied to the particulate material without agglomeration.

11. The method of claim 1, wherein the dry powder is discharged from ports separate from the liquid sprayed from the spray nozzle.

12. The method of claim 1, wherein the dry powder is discharged at a 45° angle from the sleeve.

13. The method of claim 1, wherein the dry powder is discharged at an elevation below discharge of the liquid.

14. The method of claim 1, wherein the dry powder coats the particulate material substantially without agglomeration.

15. The method of claim 1, wherein particulate material is coated substantially without aggregation.

* * * * *